US011953426B2

(12) United States Patent
Margraf (10) Patent No.: US 11,953,426 B2
(45) Date of Patent: Apr. 9, 2024

(54) MEASUREMENT LIGHT SOURCE AND MEASURING ARRANGEMENT FOR DETECTING A REFLECTION SPECTRUM (71) Applicant: CARL ZEISS SPECTROSCOPY GMBH, Jena (DE)

(72) Inventor: Joerg Margraf, Koenigsee-Rottenbach (DE)

(73) Assignee: CARL ZEISS SPECTROSCOPY GMBH, Jena (DE)

( * ) Notice: Subject to any disclaimer, the term of this patent is extended or adjusted under 35 U.S.C. 154(b) by 129 days.

(21) Appl. No.: 17/598,448

(22) PCT Filed: Mar. 17, 2020

(86) PCT No.: PCT/EP2020/057177
§ 371 (c)(1),
(2) Date: Sep. 27, 2021

(87) PCT Pub. No.: WO2020/193263
PCT Pub. Date: Oct. 1, 2020

(65) Prior Publication Data
US 2022/0187194 A1 Jun. 16, 2022

(30) Foreign Application Priority Data
Mar. 28, 2019 (DE) .................... 10 2019 107 963.2

(51) Int. Cl.
*G01N 21/57* (2006.01)
*G01N 21/25* (2006.01)
*G01N 21/84* (2006.01)

(52) U.S. Cl.
CPC ........... *G01N 21/255* (2013.01); *G01N 21/57* (2013.01); *G01N 21/8422* (2013.01);
(Continued)

(58) Field of Classification Search
CPC ................ G01N 21/57; G01N 21/255; G01N 2201/0636
See application file for complete search history.

(56) References Cited

U.S. PATENT DOCUMENTS 6,324,330 B1  11/2001  Stites
6,422,718 B1   7/2002  Anderson
(Continued)

FOREIGN PATENT DOCUMENTS

DE      3431367 A1   2/1986
DE  202008012222 U1   1/2009
(Continued)

*Primary Examiner* — Maurice C Smith
(74) *Attorney, Agent, or Firm* — Stuart H. Mayer; Kaplan Breyer Schwarz LLP (57) ABSTRACT

The present invention relates to a measurement light source for generating measurement light with a uniform spatial illumination intensity distribution. The measurement light source comprises a solid block, in which an illumination space, a light-forming space and a light exit space are each formed as a hollow space in the block and have a diffusely reflecting inner surface. The illumination space opens into the light-forming space. The light-forming space opens into the light exit space. At least one light source is at least partially arranged in the illumination space in order to generate light. The light exit space has a light exit. According to the invention, an axis of the illumination space and an axis of the light exit space are arranged at a distance from one another. The light-forming space is designed for a reversal of a light propagation direction. The invention also relates to a measuring arrangement for detecting at least an absolute reflection spectrum of a sample. The measuring arrangement is used in particular for the spectroscopic examination of surfaces in production processes in order to determine the color or gloss of surfaces, for example.

20 Claims, 7 Drawing Sheets

(52) U.S. Cl.
CPC ............... *G01N 2021/8427* (2013.01); *G01N 2201/062* (2013.01); *G01N 2201/0636* (2013.01)

(56) References Cited

U.S. PATENT DOCUMENTS

| | | | |
|---|---|---|---|
| 9,329,119 B2 * | 5/2016 | Shirata | ................... G01N 21/25 |
| 9,891,109 B2 * | 2/2018 | Sheridan | ............... G01J 3/0202 |
| 2007/0171649 A1 | 7/2007 | Rains | |
| 2008/0146909 A1 | 6/2008 | Abbink | |
| 2009/0108213 A1 | 4/2009 | Mack | |

FOREIGN PATENT DOCUMENTS

| | | | | |
|---|---|---|---|---|
| DE | 102010041749 A1 | | 4/2012 | |
| DE | 102011050969 A1 | | 5/2013 | |
| DE | 102013219830 A1 | | 4/2015 | |
| DE | 102014215193 A1 | | 2/2016 | |
| DE | 202017102313 U1 | * | 1/2018 | ................ F21V 7/04 |
| DE | 102016116405 A1 | | 3/2018 | |
| EP | 2728342 A1 | * | 5/2014 | ............ G01J 3/0272 |
| EP | 2942617 A1 | | 5/2015 | |
| EP | 3290904 A1 | | 8/2017 | |
| JP | 4348457 B2 | * | 10/2009 | ............... G02F 1/01 |
| WO | WO-2015037397 A1 | * | 3/2015 | .............. C08L 33/06 |

\* cited by examiner

MEASUREMENT LIGHT SOURCE AND MEASURING ARRANGEMENT FOR DETECTING A REFLECTION SPECTRUM

CROSS-REFERENCE TO RELATED APPLICATION

This application is a 371 National Stage of PCT/EP2020/057177, filed Mar. 17, 2020, which claims the benefit of German Application No. 102019107963.2, filed Mar. 29, 2019, the contents of which are incorporated herein by reference.

BACKGROUND OF THE INVENTION

The present invention relates to a measurement light source for generating measurement light having a uniform spatial illuminance distribution. The invention further relates to a measurement arrangement for capturing at least one absolute reflection spectrum of a sample and preferably also for performing a reference measurement. The measurement arrangement is used in particular for the spectroscopic examination of surfaces in production processes, for example to determine the color or gloss of the surfaces or layer thicknesses.

DE 10 2011 050 969 A1 shows an apparatus for the referenced measurement of reflected light with a hollow body, which has a diffusely scattering layer in its interior and a light exit opening. The apparatus can be switched from a measurement position to a calibration position, whereby the light exit opening is moved from a first detection axis to a second detection axis.

DE 10 2010 041 749 A1 discloses a measurement device with a cavity extending in a longitudinal direction, which has an opening to be turned toward a sample and a multiplicity of openings arranged in the longitudinal direction. A further opening is used to couple in light.

U.S. Pat. No. 6,422,718 B1, DE 34 31 367 A1, and DE 20 2008 012 222 U1 show measurement light sources in different embodiments.

US 2007/0171649 A1 shows a signage system for providing advertising or the like. In a first embodiment, the sign comprises a cavity in a housing with a diffusely reflective inner surface on the rear side of the housing. A sign panel on the front side of the housing has an opening to allow light to be emitted from the cavity.

US 2008/0146909 A1 discloses an optical transmission apparatus, which comprises a chamber with a light entry and with a light exit. Inner surfaces of the chamber are designed to be diffuse reflective. All the light from a light source should enter the chamber through a first opening and be diffusely reflected there before it leaves the chamber via a second opening.

DE 10 2013 219 830 A1 teaches an optical apparatus for reflection measurement under diffuse illumination, which comprises a hollow body with a light-scattering surface in its interior and with a light exit opening. The light exit opening has a rotationally asymmetrical shape.

DE 10 2014 215 193 A1 illustrates a measurement arrangement for capturing an absolute reflection spectrum of a sample. This measurement arrangement comprises a light source and a homogenizer for generating a uniform spatial illuminance distribution of the measurement light. The measurement arrangement further comprises a movable reflector and a receiver. The reflector is arranged on the same side of the sample as the light source. The homogenizer is preferably formed by an integrating sphere, an integrating tube or a ball-cylinder construction. In this measurement arrangement, the integrating sphere leads to measurement errors in the absolute measurement of more than 1% when the sample spacing changes or when the sample is tilted, which is too high for many applications. However, outside of laboratory conditions, especially in inline measurements in production processes, changes in sample spacing and sample tilting cannot be avoided.

DE 10 2016 116 405 A1 and EP 3 290 904 A2 relate to a measurement light source for generating measurement light having a uniform spatial illuminance distribution. The measurement light source comprises a hollow body with a diffusely reflective inner surface. A concave illumination space, a tubular light-shaping space, and a concave light exit space, which have a common axis, are formed in the hollow body. A light source for generating light is at least partially arranged in the illumination space. The light source is formed, for example, by at least one halogen lamp and/or at least one LED. The light exit space has a light exit. The illumination space and the light exit space lie opposite each other with their concave mirror shapes and are connected by the tubular light shaping space. In the hollow body, a diffusely reflective reflection plate is arranged for reflecting the light, which is reflected by the inner surface of the hollow body arranged in the light exit space, through the light exit to the outside of the hollow body. EP 3 290 904 A2 also shows various measurement arrangements for capturing an absolute reflection spectrum of a sample and for performing a reference measurement.

SUMMARY OF THE INVENTION

Based on the prior art, the object of the present invention is to provide a measurement arrangement for capturing a reflection spectrum, in particular a suitable measurement light source for generating measurement light having a uniform spatial illuminance distribution, which can be designed to be much more compact than an integrating sphere.

The stated object is achieved by a measurement light source in accordance with the attached claim 1 and by a measurement arrangement in accordance with the attached coordinate claim 15.

The measurement light source according to the invention is used to generate measurement light having a uniform spatial illuminance distribution. With the measurement light source according to the invention, for example, spectrometric examinations of surfaces can be carried out.

The measurement light source comprises a solid block in which an illumination space, a light shaping space, and a light exit space are formed. The illumination space, the light shaping space, and the light exit space are each designed as a cavity in the block. The illumination space, the light shaping space, and the light exit space each have a diffusely reflective inner surface for generating or passing on diffuse light. The illumination space opens into the light shaping space, with the result that light from the illumination space can enter the light shaping space. The light shaping space opens into the light exit space, with the result that light from the light shaping space can enter the light exit space.

At least one light source for generating light is at least partially arranged in the illumination space. The at least one light source is in any case arranged in such a way that it can be used to radiate light into the illumination space, wherein the at least one light source can be partially located outside the illumination space.

The light exit space has a light exit through which light can emerge from the light exit space to the outside of the block. The light emerging from the light exit forms the measurement light that can be generated by the measurement light source.

An axis of the illumination space and an axis of the light exit space are arranged at a distance from one another. The axis of the illumination space is preferably formed by a central axis of the illumination space. The axis of the light exit space is preferably formed by a central axis of the light exit space. An axis of the light exit and the axis of the light exit space preferably coincide. The illumination space is preferably designed for light propagation of the diffuse light in a first light propagation direction in the illumination space that lies in the axis of the illumination space. The light exit space is preferably designed for light propagation of the diffuse light in a second light propagation direction in the light exit space that lies in the axis of the light exit space. The axis of the illumination space and the axis of the light exit space are arranged so far apart from one another that the illumination space and the light exit space are arranged one next to the other or one above the other.

According to the invention, the light shaping space is designed for a reversal of a light propagation direction of the diffuse light. Consequently, the light entering the light shaping space from the illumination space undergoes a reversal of its light propagation direction as it propagates through the light shaping space, with the result that it enters the light exit space from the light shaping space with a reversed light propagation direction.

A particular advantage of the measurement light source according to the invention is that it can be designed to be very compact since the illumination space and the light exit space can be arranged one next to the other or one above the other and the light shaping space can be arranged axially adjacent. As a result, the installation space can be used optimally.

The measurement light that can be generated with the measurement light source according to the invention exhibits a deviation of preferably at most 0.2% in its spatial illuminance distribution. This enables the measurement light source to be used inline when measuring an absolute reflection spectrum, since a sample distance variance, a sample thickness variation, and sample tilting are tolerable.

The light that can be generated by the light source is preferably reflected at least three times in the illumination space, in the light shaping space, and in the light exit space before it emerges from the light exit. The light that can be generated by the light source is preferably reflected at least four times in the illumination space, in the light shaping space, and in the light exit space before it emerges from the light exit. A predominant part of the light that can be generated by the light source is preferably reflected many times in the illumination space, in the light shaping space, and in the light exit space before it emerges from the light exit.

The first light propagation direction and the second light propagation direction are preferably aligned opposite one another. The first light propagation direction and the second light propagation direction have an angle to one another that is preferably 180°±30°, more preferably 180°±15°, and particularly preferably 180°.

The light shaping space connects the illumination space and to the light exit space, preferably in a U-shaped or V-shaped manner.

The axis of the illumination space and the axis of the light exit space are preferably arranged parallel to one another.

The illumination space and the light exit space preferably have the same axial position, i.e. the same position in the axial direction. The illumination space and the light exit space are thus arranged one next to the other or one above the other and without any offset in the axial direction. In this respect, the illumination space, the light shaping space, and the light exit space form a U shape or a V shape, wherein the illumination space and the light exit space form the legs of the U shape or V shape.

In preferred embodiments of the measurement light source according to the invention, a homogenizer element is arranged at a transition from the light shaping space to the light exit space. The homogenizer element has a diffusely reflective illumination surface. The homogenizer element is designed to reflect the light reflected by the inner surface of the light exit space through the light exit to the outside of the block. The homogenizer element is preferably arranged in the axis of the light exit space and perpendicular to that axis. The homogenizer element preferably lies opposite the light exit in this axis. When looking from the outside through the light exit into the light exit space, the homogenizer element will be seen. The transition from the light shaping space to the light exit space is visually concealed in a radially central section with respect to the axis of the light exit space preferably by the homogenizer element, wherein a radially outer section forms a light passage from the light shaping space into the light exit space.

The homogenizer element preferably has the shape of a flat or curved plate. The curved plate is preferably curved spherically.

The homogenizer element is preferably mounted on a web, which is arranged in a central plane of the light exit space. The central plane of the light exit space preferably also forms a central plane of the illumination space and/or a central plane of the light shaping space.

The illumination space preferably has at least one light entry, in which the at least one light source is at least partially arranged. The at least one light entry is preferably formed by an opening in the block, in which the at least one light source is arranged.

The illumination space preferably has two of the light entries, to be precise a first light entry and a second light entry. The first light entry and the second light entry are preferably arranged one next to the other. At least one of the light sources is arranged in each of the light entries. A plurality of the light sources can also be arranged in one or both of the light entries. The illumination space can also have more than two of the light entries. The more than two light entries can be arranged in two adjacent groups.

The two light entries or the two groups of the light entries represent two channels for the illumination. The two-channel illumination allows, for example, a selection from different illumination spectra. The two-channel illumination can, among other things, also prevent thermal overloading of the measurement light source. The two channels can be used in alternation. In relation to the central plane of the light exit space, which preferably also forms the central plane of the illumination space and of the light shaping space, the solid block is preferably formed symmetrically with the illumination space, the light shaping space, and the light exit space.

A connecting line between the two light entries or a connecting line between the two groups of the light entries is preferably arranged perpendicular to the central plane of the light exit space.

In preferred embodiments of the measurement light source according to the invention, in each case a halogen lamp and a plurality of LEDs, which form the light sources of the measurement light source, are arranged in the first light entry or in the first group of light entries and in the second light entry or in the second group of light entries. This is preferably in each case one halogen lamp and a plurality of LEDs, preferably at least four LEDs and more preferably at least 10 LEDs. With alternative preference, at least one halogen lamp, which forms one of the light sources, is arranged in the first light entry or in the first group of light entries, whereas a plurality of LEDs, which form further ones of the light sources of the measurement light source, are arranged in the second light entry or in the second group of light entries. Preferably at least four LEDs and more preferably at least 10 LEDs are arranged in the second light entry or in the second group of light entries.

The plurality of LEDs, in particular the at least four LEDs, have in their sum an emission spectrum that preferably covers the visible range of light and more preferably the range from 340 nm to 1100 nm and even more preferably the range from 340 nm to 1620 nm.

The at least one light source can also be formed by a flash lamp, a xenon flash lamp, a deuterium lamp, an IR radiator, a white LED, a UV cathode or a UV LED. The light source can also comprise one or more optical waveguides via which the light can radiate into the illumination space. In this respect, for example, the halogen lamp can be arranged outside the illumination space. In any case, the optical waveguide or the optical waveguides open, as parts of the light source, into the illumination space, with the result that the light source is partially arranged in the illumination space.

In the case of two-channel illumination, the homogenizer element preferably has two lateral extensions in order to prevent light from the two channels, which has only been reflected a few times, from entering the light exit space. A connecting line between the lateral extensions is preferably arranged perpendicular to the central plane of the light exit space.

The measurement light source preferably comprises a lens element, which is arranged outside the block in front of the light exit. The lens element enlarges the beam of the measurement light emerging from the light exit in order to allow the full illumination of larger areas. A particular advantage of the measurement light source according to the invention is that it can be designed to be small, which means that the light exit is also small. The small light exit may be too small for some applications. The beam of the light emerging from the light exit can be enlarged by the lens element.

In preferred embodiments of the measurement light source according to the invention, the solid block has the basic shape of a cuboid or a cube having two beveled edges that form outer surfaces of the light shaping space.

In preferred embodiments of the measurement light source according to the invention, the solid block comprises at least two sub-blocks, which are firmly connected to one another. In the case of two-channel illumination in particular, the solid block preferably comprises three of the sub-blocks, which are firmly connected to one another. A connecting plane between a first of the three sub-blocks and a central second of the three sub-blocks intersects the first light entry. A connecting plane between the central second of the three sub-blocks and a third of the three sub-blocks intersects the second light entry. The connecting plane between the first sub-block and the second sub-block and the connecting plane between the second sub-block and the third sub-block are preferably aligned parallel to one another. The connecting plane between the first sub-block and the second sub-block and the connecting plane between the second sub-block and the third sub-block are preferably arranged parallel to the central plane of the light exit space. The light exit is preferably formed in the central second sub-block. The homogenizer element and, if desired, the web are preferably formed in the central second sub-block.

In preferred embodiments of the measurement light source according to the invention, the block or the sub-blocks consist of polytetrafluoroethylene (PTFE). This material is very highly diffusely reflective. The illumination space, the light shaping space, and the light exit space have a diffusely reflective surface with a reflectance of preferably at least 96% and particularly preferably at least 98% in the entire light spectrum.

A particular advantage of the measurement light source according to the invention is that it can be designed to be small. The block accordingly has outer edges, the lengths of which are preferably not greater than 90 mm, more preferably not greater than 70 mm. Between the illumination space, the light shaping space, and the light exit space, the material of the solid block, in particular the polytetrafluoroethylene, has a wall thickness that is preferably not greater than 12 mm and more preferably not greater than 10 mm. This wall thickness is preferably at least 6 mm.

The measurement arrangement according to the invention is used to capture an absolute reflection spectrum of a sample. The measurement arrangement is used, for example, for an inline measurement in a production process for large coated surfaces, such as glass panes or films for testing the surface. A reference sample is preferably not required for the capturing of the absolute reflection spectrum. The measurement arrangement therefore preferably also allows a reference measurement of measurement light used.

The measurement arrangement initially comprises the measurement light source according to the invention for generating the measurement light having a uniform spatial illuminance distribution.

The measurement arrangement further comprises an optical receiver for receiving light, which is arranged opposite the measurement light source. The light to be received is the measurement light from the measurement light source after it has traveled along a path via the sample or via a reference path. An entry opening of the receiver and an exit opening of the measurement light source are directed toward one another, apart from an offset. The optical receiver is preferably arranged on an axis of the illumination space.

The measurement arrangement is designed to be arranged parallel to a surface of the sample. In particular, the axis of the light exit space should be arranged parallel to the surface of the sample, to be precise with an offset with respect to the surface of the sample.

The measurement arrangement comprises a first mirror, which is arranged on an axis of the light exit of the measurement light source and is aligned to reflect the measurement light from the measurement light source emerging from the light exit. The first mirror is preferably arranged rigidly. The first mirror preferably has a spherical curvature. The lens element described for enlarging the beam of the measurement light emerging from the light exit is preferably arranged between the light exit and the first mirror.

The measurement arrangement also comprises a second mirror which is arranged on an axis of the optical receiver and is aligned toward the optical receiver for reflecting reflected measurement light. The second mirror is preferably arranged rigidly. The second mirror is preferably arranged on the axis of the illumination space. The second mirror is preferably arranged between the illumination space and the optical receiver.

The measurement arrangement preferably comprises a third mirror, which is settable in at least two positions, for which purpose the third mirror is pivotable. The third mirror is preferably settable in at least three positions. The third mirror is preferably arranged between the first mirror and the second mirror. In a first position of the third mirror, the latter is aligned to direct a beam path from the first mirror to the optical receiver. In a second position of the third mirror, the latter is aligned to release measurement light, which is directed from the second mirror onto the optical receiver. In a third position of the third mirror, the latter is aligned to direct measurement light reflected by the sample to the optical receiver. The measurement arrangement preferably comprises a fourth mirror.

The optical receiver is preferably formed by an optical sensor, such as in particular a spectrometer, or at least by an optical input of the optical sensor. For example, the optical receiver can be formed by an input optical unit to which an optical waveguide, which leads to a spectrometer, is connected.

The measurement light source, the optical receiver, the first mirror, the second mirror, and possibly the third mirror preferably form a measuring head. The measuring head comprises a housing in which the measurement light source, the receiver, the first mirror, the second mirror, and possibly the third mirror are arranged. The housing has a measurement opening through which the measurement light reflected by the first mirror can pass to the outside and through which the measurement light reflected by the sample can pass into the interior, in particular to the second mirror.

A plurality of the measuring heads are preferably arranged one next to the other in order to form a measurement system. With the measurement system, measurement data can be continuously collected track by track over the entire width of a sample.

The measurement light source of the measurement arrangement according to the invention is preferably formed by one of the described preferred embodiments of the measurement light source according to the invention. In addition, the measurement arrangement according to the invention preferably also has further features, which are specified in connection with the measurement light source according to the invention and its preferred embodiments.

BRIEF DESCRIPTION OF THE DRAWINGS

Further details and developments of the invention will become apparent from the following description of preferred embodiments of the invention, with reference being made to the drawing. The figures show.

DETAILED DESCRIPTION OF THE INVENTION

Figure 1:
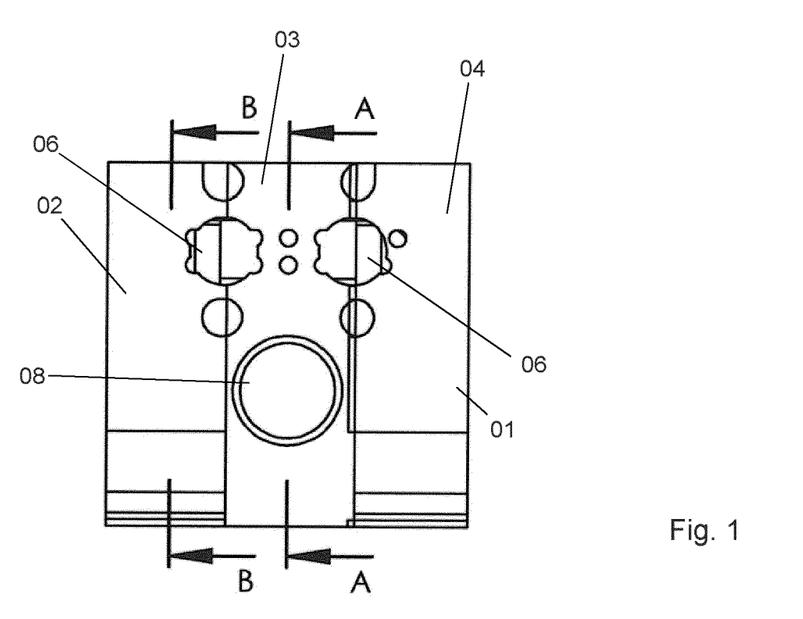
FIG. 1 is a side view of a preferred embodiment of a measurement light source according to the invention.

FIG. 1 shows a side view of a preferred embodiment of a measurement light source according to the invention. The measurement light source comprises a solid block 01 made of PTFE. The block 01 consists of a first sub-block 02, a second sub-block 03, and a third sub-block 04, which are permanently connected to one another or are monolithic. The block 01 has two light entries 06 arranged one next to the other, in each of which a light source 07 (shown in FIG. 6) is arranged. The block 01 additionally has a light exit 08, from which the light generated by the measurement light source emerges.

Figure 3:
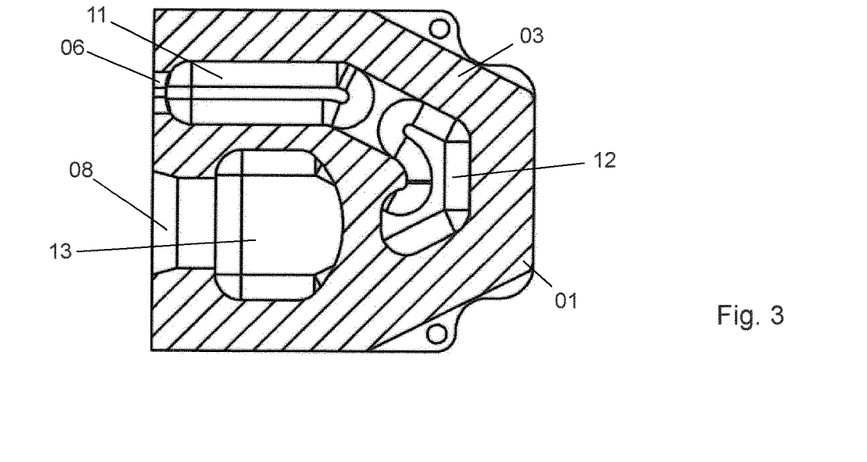
FIG. 3 is the measurement light source shown in FIG. 1 in a first cross-sectional view.
Figure 4:
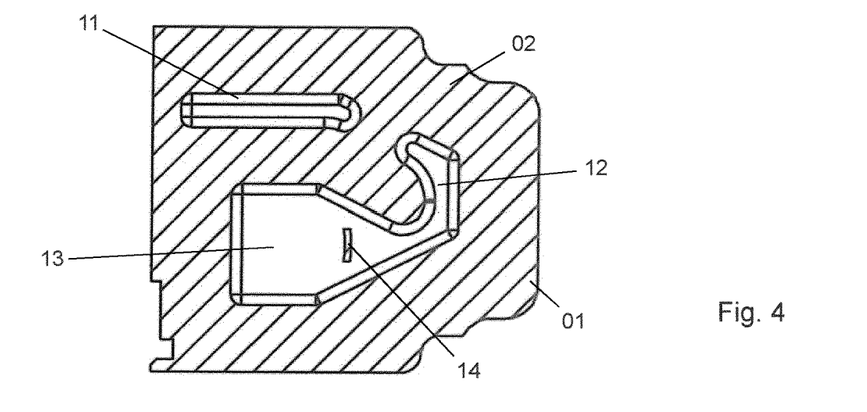
FIG. 4 is the measurement light source shown in FIG. 1 in a second cross-sectional view.

Section marks AA for a cross-sectional view shown in FIG. 3 and section marks BB for a cross-sectional view shown in FIG. 4 are also shown.

Figure 2:
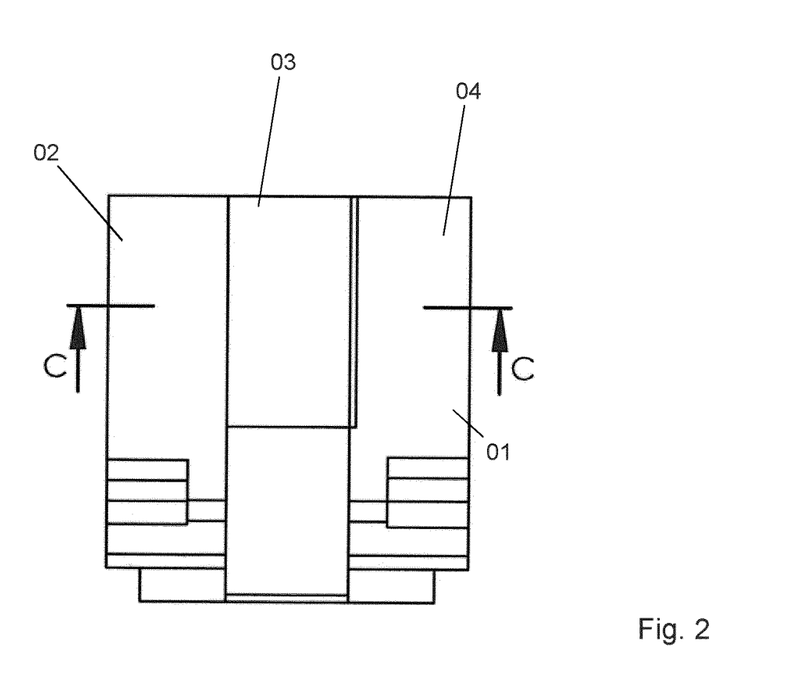
FIG. 2 is the measurement light source shown in FIG. 1 in a view from above.

FIG. 2 shows the measurement light source shown in FIG. 1 in a view from above. Section marks CC for a cross-sectional view shown in FIG. 5 are shown.

FIG. 3 shows the measurement light source shown in FIG. 1 in a first cross-sectional view AA. This cross-sectional view shows the interior of the block 01, specifically an illumination space 11, a light shaping space 12, and a light exit space 13, which are each formed by a cavity in the block 01. The illumination space 11, the light shaping space 12, and the light exit space 13 have a diffusely reflective surface with a reflectance of at least 98% in the entire light spectrum. The light entry 06 forms an entrance into the illumination space 11. The illumination space 11 opens into the light shaping space 12. The light shaping space 12 opens into the light exit space 13. The light shaping space 12 represents a U-shaped connection between the illumination space 11 and the light exit space 13. As a result, the illumination space 11 and the light exit space 13 are arranged one above the other in a space-saving manner. The light shaping space 12 is arranged laterally next to the illumination space 11 and the light exit space 13.

FIG. 4 shows the measurement light source shown in FIG. 1 in a second cross-sectional view BB. In this cross-sectional view, the illumination space 11, the light shaping space 12, and the light exit space 13 are again shown, wherein they have a smaller cross section in comparison with the representations in FIG. 3. In this cross-sectional view, a homogenizer element 14 is shown in the form of a spherical plate, which is located in the light exit space 13 and is arranged opposite the light exit 08 (shown in FIG. 3).

Figure 5:
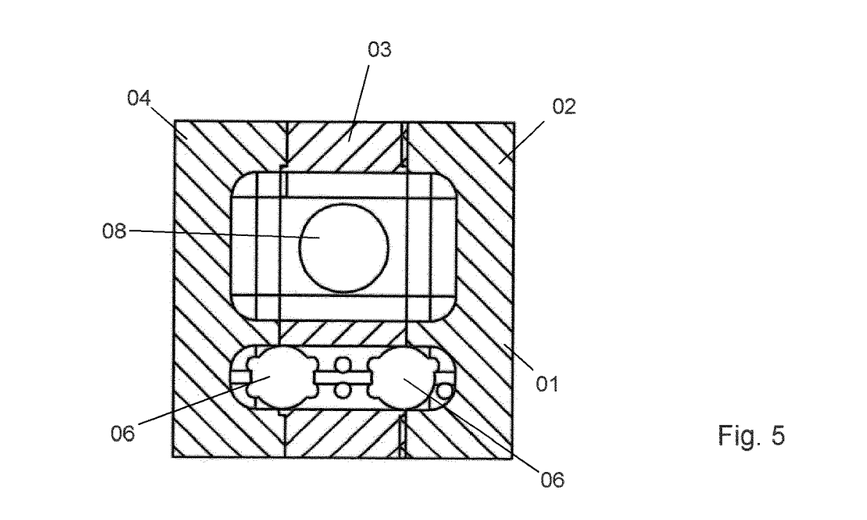
FIG. 5 is the measurement light source shown in FIG. 1 in a third cross-sectional view.

FIG. 5 shows the measurement light source shown in FIG. 1 in a third cross-sectional view CC. In this cross-sectional view, the light entries 06 and the light exit 08 are shown, among other things.

Figure 6:
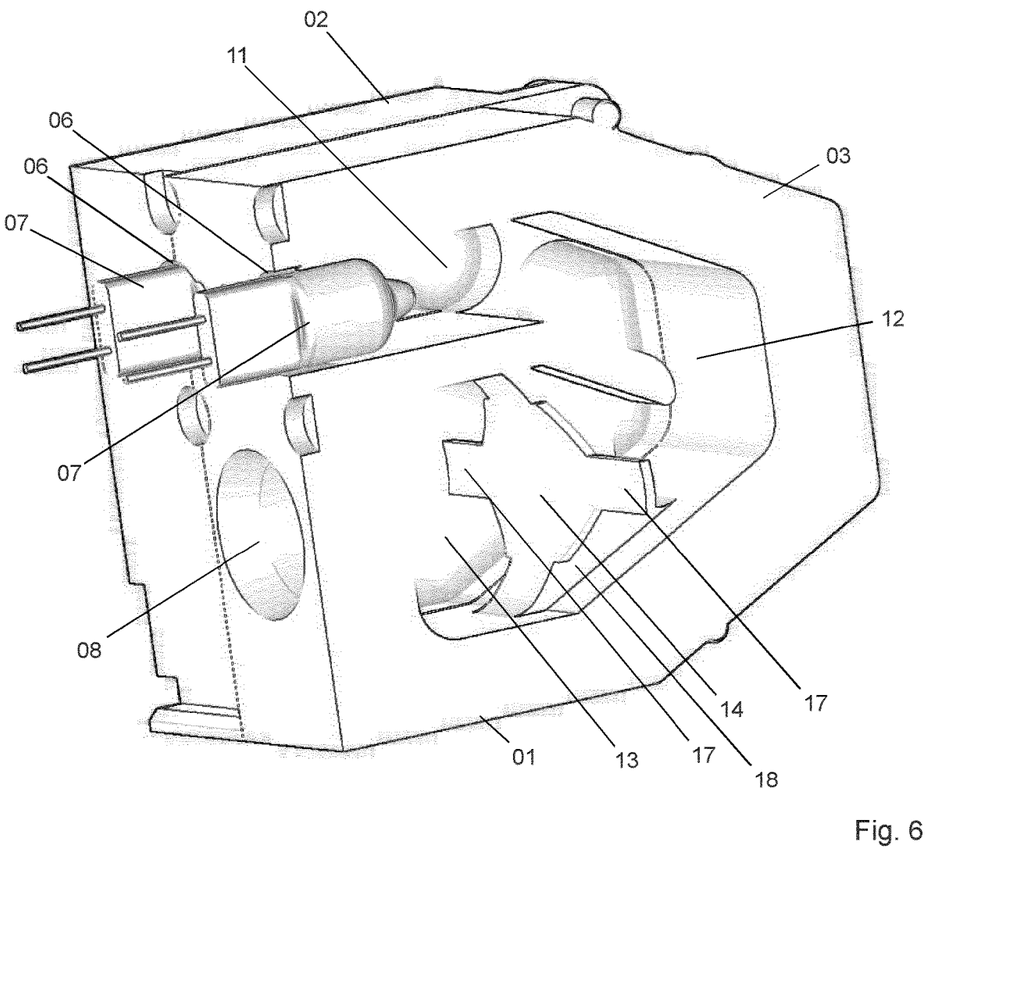
FIG. 6 is the measurement light source shown in FIG. 1 in a perspective sectional view.

FIG. 6 shows the measurement light source shown in FIG. 1 in a perspective sectional view. In this perspective sectional view, the spatial dimensions of the illumination space 11, the light shaping space 12, and the light exit space 13 are shown. One of the two light sources 07, which in the embodiment shown are formed, for example, by halogen lamps, is arranged in each of the two light entries 06. The two light sources 07 give rise to a two-channel design of the measurement light source. Accordingly, the illumination space 11, the light shaping space 12, and the light exit space 13 have a corresponding extent perpendicular to the cross-sectional plane shown here, i.e. the illumination space 11, the light shaping space 12, and the light exit space 13 and also the measurement light source in their entirety have an increased width for the two-channel design.

In this perspective sectional view, the homogenizer element 14 is additionally shown. The homogenizer element 14 has two lateral rectangular extensions 17, which prevent light from the two channels, which was only reflected a few times, from entering the light exit space 13. The homogenizer element 14 is held in the central second sub-block 03 by a web 18.

Figure 7:
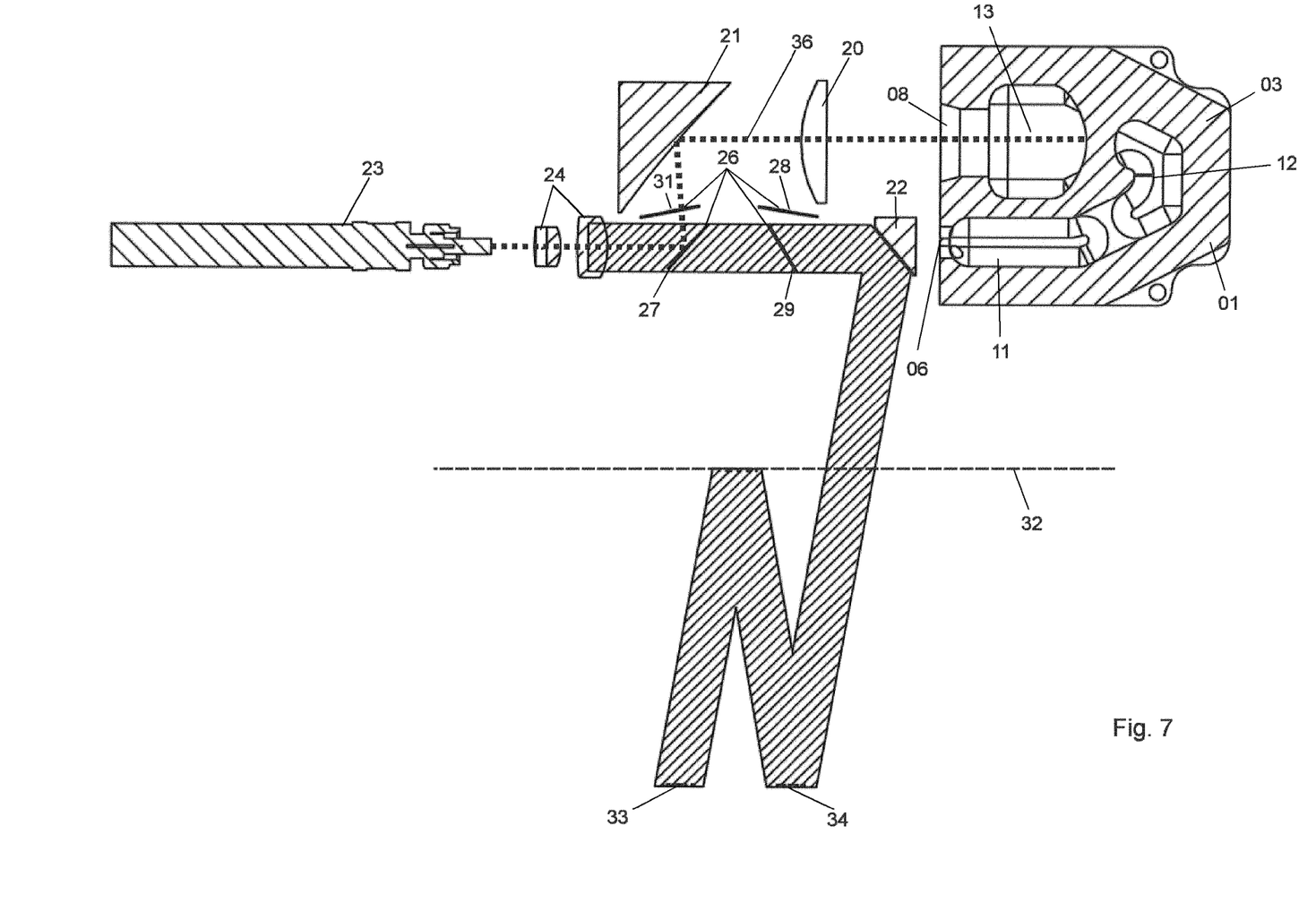
FIG. 7 is a simplified sectional view of a preferred embodiment of a measurement arrangement according to the invention during a bypass measurement.

FIG. 7 shows a simplified sectional view of a preferred embodiment of a measurement arrangement according to the invention during a bypass measurement. The measurement arrangement has the measurement light source shown in FIG. 1, comprising, among other things, the block 01 with the illumination space 11, the light shaping space 12, and the light exit space 13 and also the light entries 06 and the light exit 08. The measurement light source additionally comprises a lens element 20 for enlarging the beam of the measurement light emerging from the light exit 08. The measurement arrangement comprises a first mirror 21, on which the measurement light that has passed through the lens element 20 is incident. The first mirror 21 is spherically curved and is arranged in a fixed manner. The measurement arrangement additionally comprises a second mirror 22, which is directed onto an optical receiver 23. Lens elements 24, which focus the reflected measurement light, are arranged upstream of the optical receiver 23. The measurement arrangement additionally comprises a third mirror 26, which is adjustable in its alignment and is shown in a first position 27, in a second position 28, in a third position 29, and in a fourth position 31.

A sample (not shown) is to be arranged in a sample plane 32.

The measurement arrangement further comprises a black standard 33 and a counter mirror 34, which are arranged below the sample plane 32.

A beam path 36 of the measurement light is shown, which occurs during the bypass measurement in order to enable a 100% white measurement, whereby the measurement arrangement can be adjusted to 100% white of the measurement light source. Accordingly, the first position 27 of the third mirror 26 is used for a bypass measurement.

Figure 8:
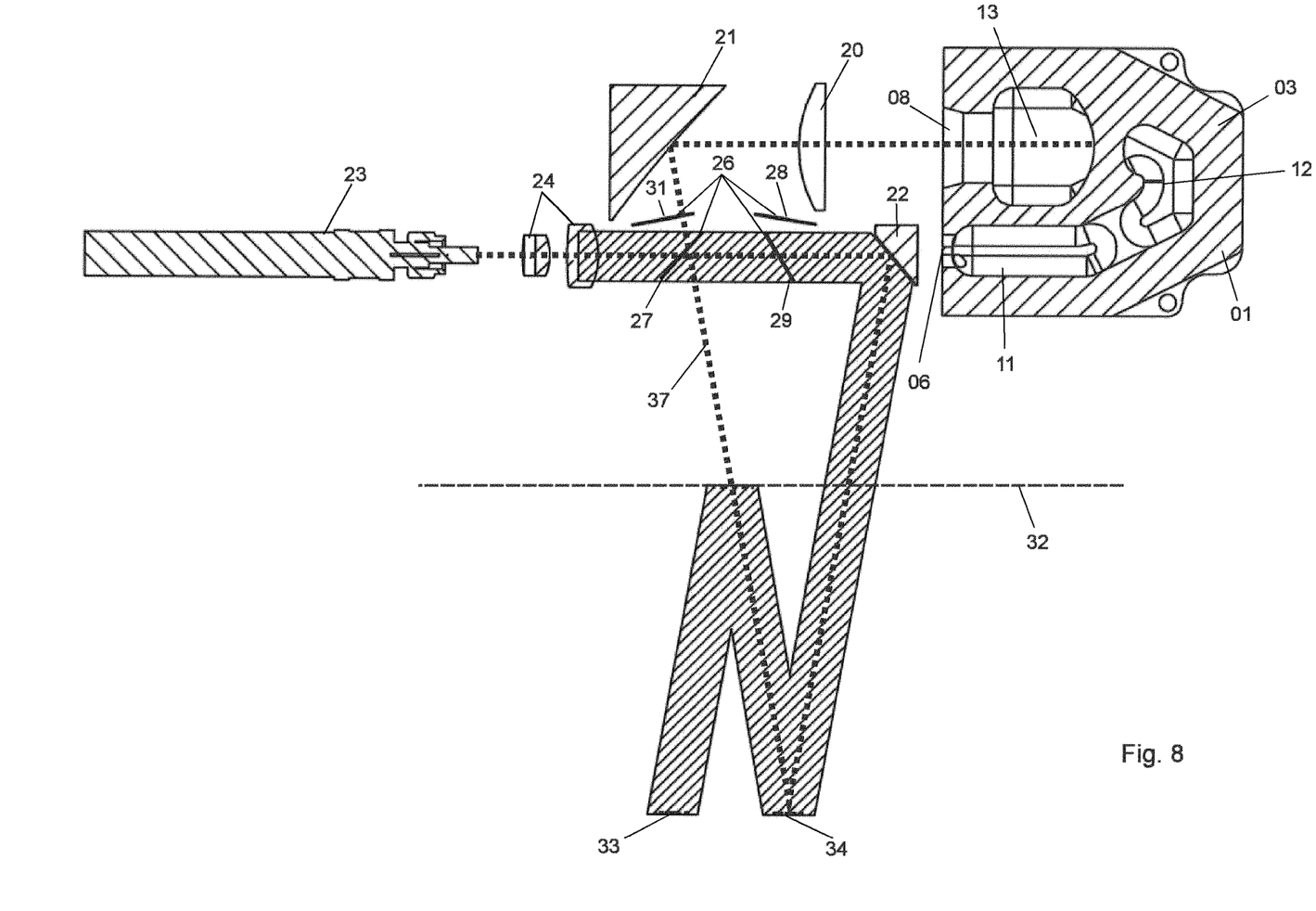
FIG. 8 is the measurement arrangement shown in FIG. 7 during a transmission measurement.

FIG. 8 shows the measurement arrangement shown in FIG. 7 during a transmission measurement. A beam path 37 of the measurement light is shown, which occurs during this transmission measurement. The beam path 37 passes through the sample (not shown) in the sample plane 32 and is reflected at the counter mirror 34 and at the second mirror 22. The third mirror 26 is in its second position 28, as a result of which it releases the beam path 37. Accordingly, the second position 28 of the third mirror 26 is used for a transmission measurement.

Figure 9:
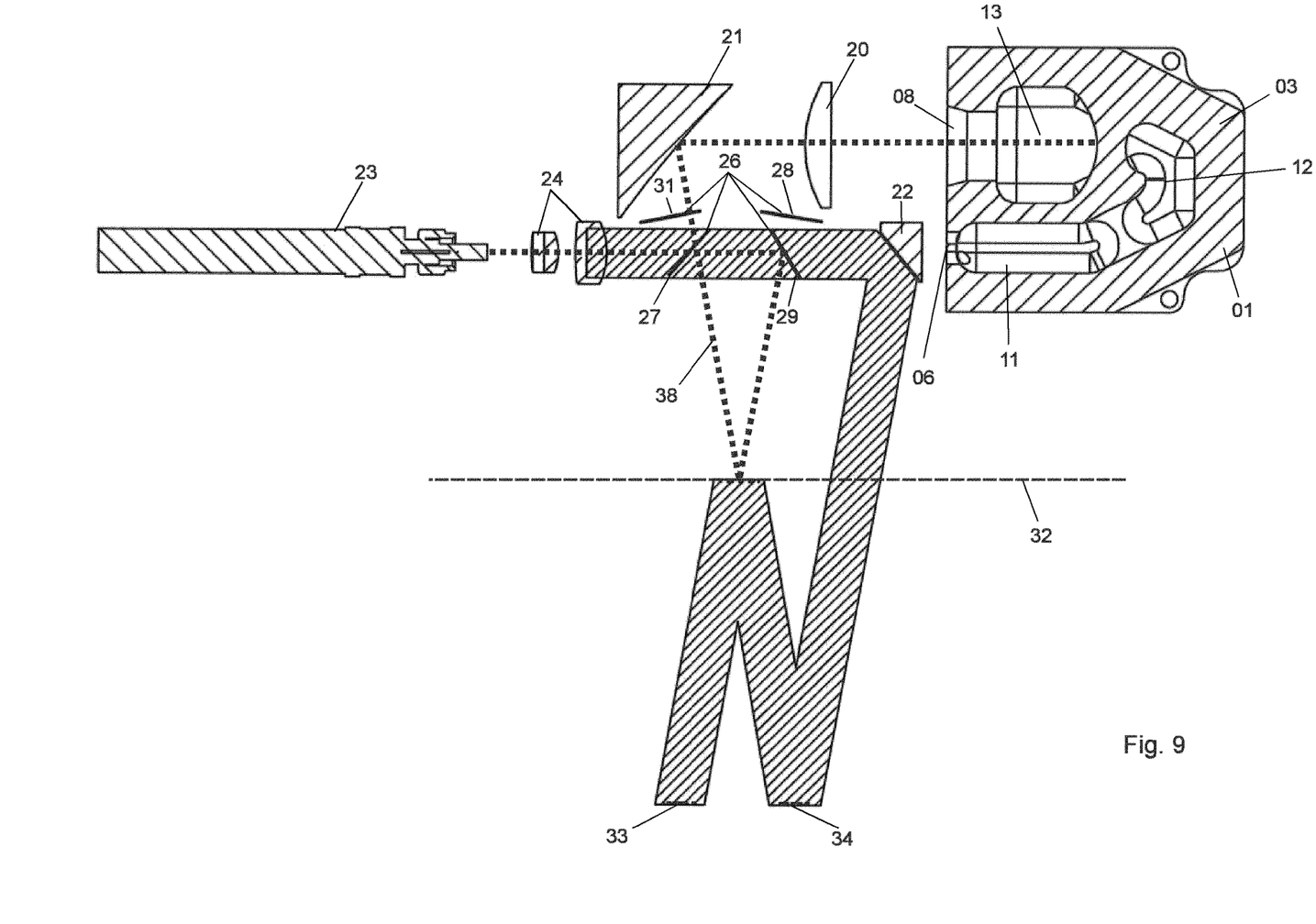
FIG. 9 is the measurement arrangement shown in FIG. 7 during a reflection measurement.

FIG. 9 shows the measurement arrangement shown in FIG. 7 during a reflection measurement. A beam path 38 of the measurement light is shown, which occurs during this reflection measurement. The beam path 38 is reflected by the sample (not shown) in the sample plane 32 and at the third mirror 26, which is in its third position 29. Accordingly, the third position 29 of the third mirror 26 is used for a reflection measurement.

Figure 10:
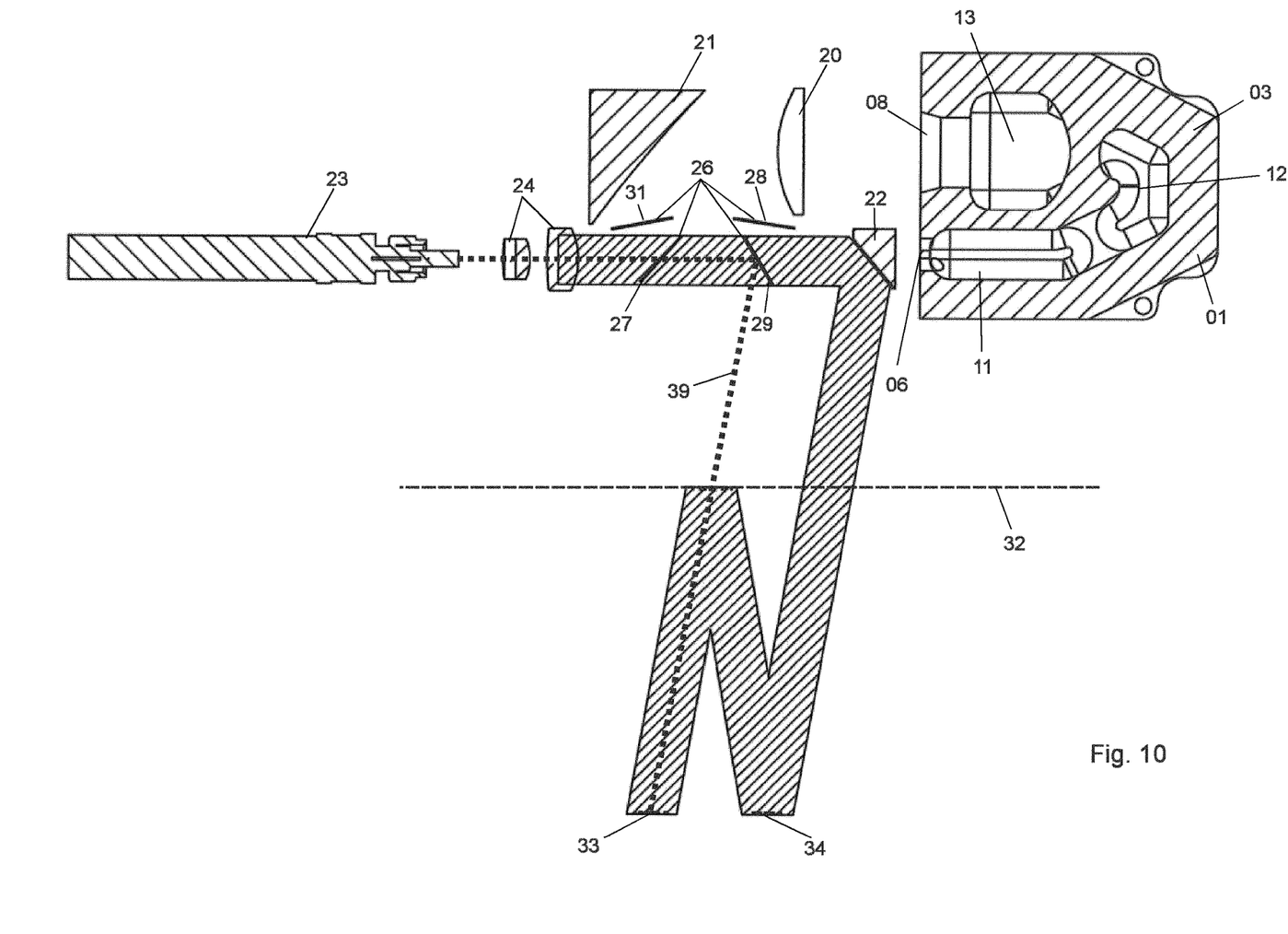
FIG. 10 is the measurement arrangement shown in FIG. 7 during a dark measurement.

FIG. 10 shows the measurement arrangement shown in FIG. 7 during a dark measurement. A beam path 39 is shown, which symbolizes that the optical receiver 23 is directed toward the black standard 33 via the third mirror 26, which is in the third position 29. Accordingly, the third position 29 of the third mirror 26 is also used for a dark measurement.

The invention claimed is:

1. A measurement light source; comprising a solid block, in which an illumination space, a light shaping space, and a light exit space are each formed as a cavity in the block and have a diffusely reflective inner surface; wherein the illumination space opens into the light shaping space; wherein the light shaping space opens into the light exit space; wherein at least one light source for generating light is at least partially arranged in the illumination space; wherein the light exit space has a light exit; wherein an axis of the illumination space and an axis of the light exit space are arranged at a distance from one another; and wherein the light shaping space is designed for a reversal of a light propagation direction; wherein light is able to emerge from the light exit space through the light exit to an outside of the block, the light emerging from the light exit forms measurement light generated by the measurement light source, wherein a homogenizer element with a diffusely reflective illumination surface, which is arranged in the axis of the light exit space and is arranged perpendicular to that axis, is arranged at a transition from the light shaping space to the light exit space.

2. The measurement light source as claimed in claim 1, wherein the illumination space is designed for light propagation in a first light propagation direction, and in that the light exit space is designed for light propagation in a second light propagation direction, wherein the first light propagation direction and the second light propagation direction are aligned opposite one another.

3. The measurement light source as claimed in claim 1, wherein the light shaping space connects the illumination space with the light exit space in a U-shaped or V-shaped manner.

4. The measurement light source as claimed in claim 1, wherein the axis of the illumination space and the axis of the light exit space are arranged parallel to one another, wherein the illumination space and the light exit space have the same axial position.

5. The measurement light source as claimed in claim 4, wherein the illumination space, the light shaping space and the light exit space form a U shape or a V shape, wherein the illumination space and the light exit space each form a leg of the U shape or the V shape.

6. The measurement light source as claimed in claim 1, wherein the homogenizer element is mounted on a web, which is arranged in a central plane of the light exit space.

7. The measurement light source as claimed in claim 1, wherein the illumination space has at least one light entry in which the at least one light source is at least partially arranged.

8. The measurement light source as claimed in claim 7, wherein the illumination space has two of the light entries or two groups of the light entries, which are arranged one next to the other.

9. The measurement light source as claimed in claim 8, wherein at least one of the light sources (07) is at least partially arranged in each of the light entries or in each of the groups of the light entries.

10. The measurement light source as claimed in claim 9, wherein the at least one light source is arranged in the form of a halogen lamp in a first of the light entries or in a first of the groups of the light entries, wherein the plurality of light sources are arranged in the form of a plurality of LEDs in a second of the light entries (06) or in a second of the groups of the light entries.

11. The measurement light source as claimed in claim 8, wherein the solid block comprises three sub-blocks, which are firmly connected to one another, wherein a connecting plane between a first of the three sub-blocks and a central second of the three sub-blocks intersects the first light entry, wherein a connecting plane between the central second of the three sub-blocks and a third of the three sub-blocks intersects the second light entry, and wherein the light exit is formed in the central second sub-block.

12. The measurement light source as claimed in claim 1, wherein the solid block has the basic shape of a cuboid, which has two beveled edges that form outer surfaces of the light shaping space.

13. A measurement light source; comprising a solid block, in which an illumination space, a light shaping space, and a light exit space are each formed as a cavity in the block and have a diffusely reflective inner surface; wherein the illumination space opens into the light shaping space; wherein the light shaping space opens into the light exit space; wherein at least one light source for generating light is at least partially arranged in the illumination space; wherein the light exit space has a light exit; wherein an axis of the illumination space and an axis of the light exit space are arranged at a distance from one another; and wherein the light shaping space is designed for a reversal of a light propagation direction; wherein light is able to emerge from the light exit space through the light exit to an outside of the block, the light emerging from the light exit forms measurement light generated by the measurement light source, wherein the solid block has outer edges, the lengths of which are not greater than 90 mm.

14. The measurement light source as claimed in claim 13, wherein the illumination space is designed for light propagation in a first light propagation direction, and in that the light exit space is designed for light propagation in a second light propagation direction, wherein the first light propagation direction and the second light propagation direction are aligned opposite one another.

15. The measurement light source as claimed in claim 13, wherein the light shaping space connects the illumination space with the light exit space in a U-shaped or V-shaped manner.

16. The measurement light source as claimed in claim 13, wherein the axis of the illumination space and the axis of the light exit space are arranged parallel to one another, wherein the illumination space and the light exit space have the same axial position.

17. The measurement light source as claimed in claim 13, wherein the illumination space has at least one light entry in which the at least one light source is at least partially arranged.

18. The measurement light source as claimed in claim 13, wherein the solid block comprises three sub-blocks, which are firmly connected to one another, wherein a connecting plane between a first of the three sub-blocks and a central second of the three sub-blocks intersects the first light entry, wherein a connecting plane between the central second of the three sub-blocks and a third of the three sub-blocks intersects the second light entry, and wherein the light exit is formed in the central second sub-block.

19. The measurement light source as claimed in claim 13, wherein the solid block has the basic shape of a cuboid, which has two beveled edges that form outer surfaces of the light shaping space.

20. A measurement arrangement for capturing an absolute reflection spectrum of a sample; comprising:
a measurement light source, wherein the measurement light source includes:
a solid block, in which an illumination space, a light shaping space, and a light exit space are each formed as a cavity in the block and have a diffusely reflective inner surface; wherein the illumination space opens into the light shaping space; wherein the light shaping space opens into the light exit space; wherein at least one light source for generating light is at least partially arranged in the illumination space; wherein the light exit space has a light exit; wherein an axis of the illumination space and an axis of the light exit space are arranged at a distance from one another; and wherein the light shaping space is designed for a reversal of a light propagation direction; wherein light is able to emerge from the light exit space through the light exit to an outside of the block, the light emerging from the light exit forms measurement light generated by the measurement light source;
an optical receiver for receiving measurement light, which is arranged opposite the measurement light source;
a first mirror, which is arranged on an axis of the light exit and is aligned to reflect the measurement light emerging from the light exit; and
a second mirror, which is arranged on an axis of the optical receiver and is aligned toward the optical receiver for reflecting reflected measurement light.

* * * * *